(12) United States Patent
Funaki

(10) Patent No.: US 12,297,152 B2
(45) Date of Patent: May 13, 2025

(54) SILICON NITRIDE SINTERED BODY, WEAR-RESISTANT MEMBER USING THE SAME, AND METHOD FOR PRODUCING SILICON NITRIDE SINTERED BODY

(71) Applicants: KABUSHIKI KAISHA TOSHIBA, Tokyo (JP); TOSHIBA MATERIALS CO., LTD., Yokohama (JP)

(72) Inventor: Kai Funaki, Yokohama (JP)

(73) Assignees: Kabushiki Kaisha Toshiba, Tokyo (JP); Toshiba Materials Co., Ltd., Yokohama (JP)

( * ) Notice: Subject to any disclaimer, the term of this patent is extended or adjusted under 35 U.S.C. 154(b) by 26 days.

(21) Appl. No.: 18/057,847

(22) Filed: Nov. 22, 2022

(65) Prior Publication Data
US 2023/0093291 A1 Mar. 23, 2023

Related U.S. Application Data

(63) Continuation of application No. PCT/JP2021/019816, filed on May 25, 2021.

(30) Foreign Application Priority Data

May 26, 2020 (JP) ................................. 2020-091162

(51) Int. Cl.
*C04B 35/587* (2006.01)
*C04B 35/626* (2006.01)
*C04B 35/64* (2006.01)

(52) U.S. Cl.
CPC ...... *C04B 35/587* (2013.01); *C04B 35/62695* (2013.01); *C04B 35/64* (2013.01);
(Continued)

(58) Field of Classification Search
None
See application file for complete search history.

(56) References Cited

U.S. PATENT DOCUMENTS

| | | |
|---|---|---|
| 2012/0321851 A1 | 12/2012 | Takao |
| 2015/0251957 A1* | 9/2015 | Funaki .................. F16C 33/145 501/87 |

(Continued)

FOREIGN PATENT DOCUMENTS

| | | |
|---|---|---|
| CN | 106518089 A | 3/2017 |
| JP | S33-009768 B | 11/1958 |

(Continued)

OTHER PUBLICATIONS

International Search Report and Written Opinion (Application No. PCT/JP2021/019816) dated Jul. 20, 2021.
(Continued)

*Primary Examiner* — Ronak C Patel
(74) *Attorney, Agent, or Firm* — BURR PATENT LAW, PLLC

(57) ABSTRACT

A silicon nitride sintered body includes a silicon nitride crystal grains and grain boundary phases. Further, when D stands for width of the silicon nitride sintered body before being subjected to surface processing, relations between an average grain diameter dA and an average aspect ratio rA of the silicon nitride crystal grain in a first region from an outermost surface to a depth of 0 to 0.01D and an average grain diameter dB and an average aspect ratio rB of the silicon nitride crystal grain in a second region inside the first region satisfy the inequalities:

$0.8 \leq dA/dB \leq 1.2$; and $0.8 \leq rA/rB \leq 1.2$.

7 Claims, 2 Drawing Sheets

(52) U.S. Cl.
CPC ............... *C04B 2235/3873* (2013.01); *C04B 2235/786* (2013.01); *C04B 2235/87* (2013.01)

(56) References Cited

U.S. PATENT DOCUMENTS

2018/0134626 A1* 5/2018 Ikeda .................... C04B 35/584
2018/0250738 A1* 9/2018 Nakamura ............. B22F 1/102

FOREIGN PATENT DOCUMENTS

| | | |
|---|---|---|
| JP | H05-170547 A | 9/1993 |
| JP | H09-077560 A | 3/1997 |
| JP | H09-157031 A | 6/1997 |
| JP | H09-235165 A | 9/1997 |
| JP | 2002-053376 A | 2/2002 |
| JP | 2006-036554 A | 2/2006 |
| JP | 2011-016716 A | 1/2011 |
| JP | 2014-073944 A | 4/2014 |
| JP | 2014-073945 A | 4/2014 |
| WO | 2011/102298 A1 | 8/2011 |

OTHER PUBLICATIONS

Extended European Search Report dated Jun. 7, 2024 (Application No. 21811913.9).

* cited by examiner

SILICON NITRIDE SINTERED BODY, WEAR-RESISTANT MEMBER USING THE SAME, AND METHOD FOR PRODUCING SILICON NITRIDE SINTERED BODY

CROSS-REFERENCE TO RELATED APPLICATION

This application is a Continuation Application of No. PCT/JP2021/019816, filed on May 25, 2021, and the PCT application is based upon and claims the benefit of priority from Japanese Patent Application No. 2020-091162, filed on May 26, 2020, the entire contents of which are incorporated herein by reference.

FIELD

Embodiments relate to a silicon nitride sintered body, a wear-resistant member using the same, and a method for producing the silicon nitride sintered body.

BACKGROUND

A ceramic sintered body mainly composed of silicon nitride ($Si_3N_4$) exhibits excellent heat resistance and has various properties such as excellent resistance to thermal shock due to its low coefficient of thermal expansion, and thus have been increasingly applied to engine parts, mechanical parts for steelmaking and the like, as a high-temperature structural material in place of a conventional heat-resistant alloy. The ceramic sintered body is also under development for practical use as a rolling member or a cutting tool because of its excellent wear resistance.

Since silicon nitride is a sinter-resistant body, uniform sintering is difficult, and various efforts have been made. In Patent Document 1, a homogeneous sintered body is produced by embedding and then sintering silicon nitride in a mixed powder of silicon nitride, silica ($SiO_2$) and the like to increase the partial pressure of the surrounding SiO gas, thereby eliminating weight loss. In Patent Document 2, a homogeneous sintered body is produced by coating silicon nitride with a mixed powder of silicon nitride, a sintering aid, and then the like and sintering to suppress evaporation of the sintering aid from the vicinity of an interface thereof. In Patent Document 3, a homogeneous sintered body is produced by controlling a proportion of α-phase and β-phase by spark plasma sintering. In Patent Document 4, a homogeneous sintered body is produced by sintering using a carbonaceous vessel in which silicon nitride and aluminum oxide ($Al_2O_3$) are placed and the carbonaceous vessel is heat-treated. In Patent Document 5, a homogeneous sintered body is produced by controlling a cooling rate during sintering using granulated powder to which moisture is added after drying.

A silicon nitride sintered body has been widely used for wear-resistant members such as engine parts, mechanical parts, bearing balls, and cutting tools. The silicon nitride sintered body is much more excellent in durability than metal members such as bearing steel (SUJ2), therefore providing a long-term reliability in various wear-resistant members such as bearing balls. This also makes them maintenance-free for a long period.

In recent years, ceramics with excellent properties have been used for large bearings such as large generators, wind power generators, and aircraft engines. Requirements on quality characteristics stricter than before are necessary for these large members, and the load applied to silicon nitride parts used is increased. However, as ceramic parts become larger, they are more prone to unevenness during sintering, and the homogeneity is not always sufficient. Thus, for example, when a silicon nitride bearing ball is produced, it is necessary to polish the surface thereof. However, differences in the amount of polishing may occur due to differences in the microstructure between portions close to the surface and the inside.

DETAILED DESCRIPTION

Hereinafter, the silicon nitride sintered body, the wear-resistant member using the same, and the method for producing the silicon nitride sintered body according to embodiments will be described in detail.

A silicon nitride sintered body according to the present embodiment includes a silicon nitride crystal grains and grain boundary phases to solve such problems. Further, when D stands for width of the silicon nitride sintered body before being subjected to surface processing, relations between an average grain diameter dA and an average aspect ratio rA of the silicon nitride crystal grain in a first region from an outermost surface to a depth of 0 to 0.01D and an average grain diameter dB and an average aspect ratio rB of the silicon nitride crystal grain in a second region inside the first region satisfy the inequalities:

$$0.8 \leq dA/dB \leq 1.2; \text{ and}$$

$$0.8 \leq rA/rB \leq 1.2.$$

Figure 1:
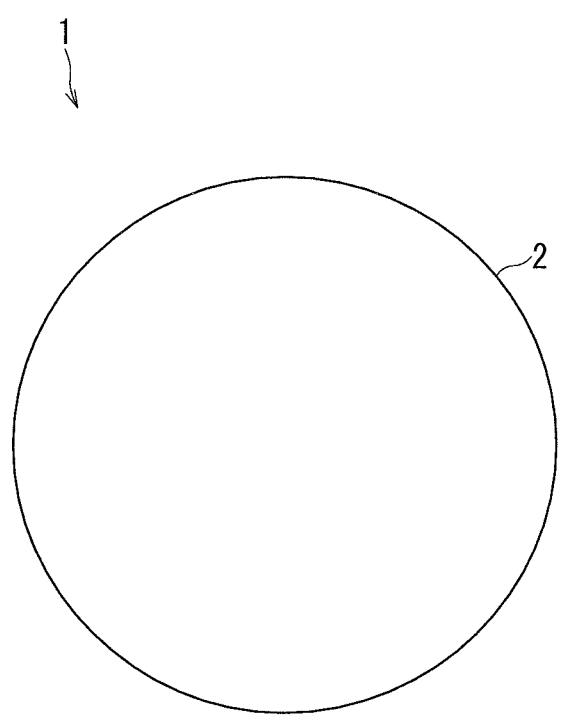
FIG. 1 is a diagram illustrating an example of a bearing ball as a wear-resistant member using a silicon nitride sintered body according to an embodiment.
Figure 2:
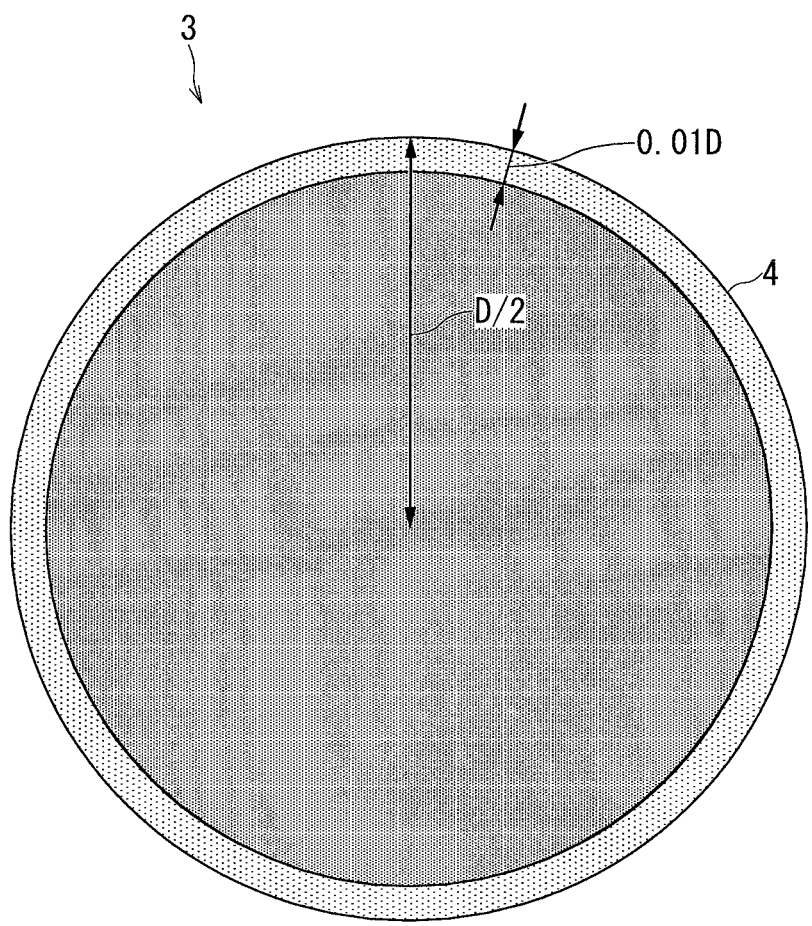
FIG. 2 is a diagram illustrating an example of a cross section of a silicon nitride sintered body according to an embodiment.

FIG. 1 is a diagram illustrating an example of a bearing ball as a wear-resistant member using a silicon nitride sintered body according to an embodiment. FIG. 2 is a diagram illustrating an example of a cross section of a silicon nitride sintered body according to an embodiment.

FIG. 1 illustrates a bearing ball as s wear-resistant member using the silicon nitride sintered body according to an embodiment. In FIGS. 1 and 2, reference numeral 1 denotes a bearing ball (sliding member), reference numeral 2 denotes a sliding face, reference numeral 3 denotes a cross section of the silicon nitride sintered body, and reference numeral 4 denotes a surface of the sintered body. The wear-resistant member using the silicon nitride sintered body is not limited to a bearing ball 1, and may be an engine part, a mechanical part, a bearing ball, a cutting tool, or the like. The wear-resistant member (or silicon nitride sintered body) has a shape including an arc. For example, the wear-resistant member (or silicon nitride sintered body) has a spherical shape or a cylindrical shape with circles as top and bottom faces. The sphere includes an arc shape in the cross section including its center. The cylinder includes an arc shape in the cross section parallel to the top (or bottom) face thereof. Here, the sphere includes a true sphere (with a sphericity of 0) and a non-true sphere within an error range when producing the true sphere (e.g., 0<sphericity 0≤0.45 μm). The cylinder includes a true cylinder and a non-cylinder within an error range when producing the cylinder, and the circle includes a true circle and a non-true circle within an error range when producing the true circle. Hereinafter, a case where the wear-resistant member (or silicon nitride sintered body) has a spherical shape will be described unless otherwise specified.

The sphere, and the circles on the top and bottom faces of the cylinder suitably have a width, i.e., a diameter of 70 mm or less because if the diameter of the wear-resistant member exceeds 70 mm, the wear-resistant member is more prone to unevenness during sintering as it becomes larger, and homogeneity will not always be sufficient. The sphere and the circles on the top and bottom faces of the cylinder more suitably have a diameter of 60 mm or less. It is preferable that the wear-resistant member (or silicon nitride sintered body), i.e., the sphere and the circles on the top and bottom faces of the cylinder, are large enough, for example, have a diameter of 8 mm or more. This is because strict quality characteristics corresponding to a large load on the wear-resistant member can be satisfied.

The silicon nitride sintered body according to an embodiment has a silicon nitride crystal grain and a grain boundary phase. When D stands for width of the silicon nitride sintered body before being subjected to surface processing, a relation between an average grain diameter dA and an average aspect ratio rA of the silicon nitride crystal grain in a first region from an outermost surface to a depth of 0 to 0.01D and an average grain diameter dB and an average aspect ratio rB of the silicon nitride crystal grain in a second region inside the first region satisfies the following inequalities, provided that the width is the spherical diameter or the circle diameter of the cylinder if the silicon nitride sintered body has a spherical shape or a cylindrical shape:

$0.8 \leq dA/dB \leq 1.2$; and $0.8 \leq rA/rB \leq 1.2$.

More suitably, the relation between the average grain diameter dA and the average aspect ratio rA and the average grain diameter dB and the average aspect ratio rB further satisfies the following inequalities:

$0.8 \leq dA/dB \leq 0.97$; $1.01 \leq dA/dB \leq 1.2$;

$0.8 \leq rA/rB \leq 0.95$; and $1.05 \leq rA/rB \leq 1.2$.

Although a sintered body with dA/dB around 1 or rA/rB around 1 is ideal from the viewpoint of uniformity, manufacturing thereof requires labor and cost.

Silicon nitride crystal grains constituting the silicon nitride sintered body achieve high strength and high toughness by growing into needle-like shapes during sintering. The shape of needle-like crystals can be expressed by grain size and aspect ratio (ratio of long side to short side in a rectangle). During the sintering process of silicon nitride, grain growth occurs so as to fill grain boundaries (spaces), and thus the grain size and aspect ratio increase. Larger grain size fills the grain boundaries (spaces) and increases strength, but too large grain size causes gaps (defects) between silicon nitride crystal grains, which reduces strength. The aspect ratio becomes large as the grain growth occurs, and the strength is improved by complicated entanglement of the needle-like crystals.

When the crystal grains on or near the surface of the silicon nitride sintered body are compared with the crystal grains inside the silicon nitride sintered body, the grain size may be larger and the aspect ratio smaller on or near the surface. This is due to the crystal grains on or near the surface become closer to a spherical shape by heat applied externally during sintering and gases generated from inside the sintering body, etc. Grains having a large grain size and a small aspect ratio are less entangled with surrounding grains and have low strength because of accompanying defects in their surroundings. Therefore, the grains are preferentially removed in the polishing process and form a starting point for the processing.

Conversely, the grain size may be smaller and the aspect ratio larger near the surface. This is due to the growth of long and thin needle-like crystals depending on the sintering rate and the state of raw materials and additives. The elongated crystal grains become tightly entangled with the surrounding grains and are less likely to be removed during the polishing process.

Thus, the difference in grain size and aspect ratio between the surface and the inside results in a difference in the amount of processing during polishing.

To eliminate the difference in processing of the entire silicon nitride sintered body during polishing, it is important to make the state of the crystal grains on or near the surface and inside similar, and it is effective to bring the grain size and aspect ratio on or near the surface and inside close to each other.

When the average grain diameter dA of the silicon nitride crystal grain in a first region from the outermost surface to a depth of 0 to 0.01D is compared with the average grain diameter dB of the silicon nitride crystal grain in a second region inside the first region, it should satisfy the range of $0.8 \leq dA/dB \leq 1.2$. For example, when the silicon nitride sintered body is a sphere, the average grain diameters dA and dB are determined based on the silicon nitride crystal grain present in a 20 µm×20 µm unit area in each of the two-dimensional first and second regions in a circular cross section including the center of the silicon nitride sintered body (i.e., cross section including the diameter). This is because when dA/dB is less than 0.8, the crystal grain on or near the surface becomes too small to be removed, which may cause unevenness of processing. Another reason is that when dA/dB is more than 1.2, the crystal grain on or near the surface becomes too large, resulting in grain removal, and similarly, the unevenness of processing may occur due to an increase in the number of starting points for processing.

In this range limitation of the average grain size ratio, the closer to 1.0, the less possible of grain removal, which leads to ideal distribution of crystal grains. Therefore, the more preferred range limitation is $0.9 \leq dA/dB \leq 1.1$.

When the average aspect ratio rA of the silicon nitride crystal grain in the first region from the outermost surface to a depth of 0 to 0.01D is compared with the average aspect ratio rB of the silicon nitride crystal grain in the second region inside the first region, it should satisfy the range of $0.8 \leq rA/rB \leq 1.2$. For example, when the silicon nitride sintered body is a sphere, the average aspect ratios rA and rB are determined based on the silicon nitride crystal grain present in a 20 µm×20 µm unit area in each of the two-dimensional first and second regions in a circular cross section including the center of the silicon nitride sintered body. This is because when rA/rB is less than 0.8, the needle-like crystal grain on or near the surface becomes too short, resulting in grain removal, and the unevenness of processing may occur due to an increase in the number of starting points for processing. Another reason is that when rA/rB is more than 1.2, the entanglement of needle-like crystal grains on or near the surface becomes tight and makes it difficult to process, resulting in unevenness of processing.

In this range limitation of the aspect ratio, the closer to 1.0, the less possible of grain removal, which leads to ideal distribution of needle-like crystal grains. Therefore, the more preferred range limitation is $0.9 \leq rA/rB \leq 1.1$.

It is preferable that 40% or more of silicon nitride crystal grains having dA and dB both of 1.1 µm or more are present in each region. This is because the presence of a large number of silicon nitride crystal grains with sufficient grain growth up to a size having low possibility of removal is required to prevent grain removal.

When the ratio pA of the silicon nitride crystal grain to the total value of elements other than Si and N in the first region from the outermost surface to a depth of 0 to 0.01D is compared with the ratio pB of the silicon nitride crystal grain to the total value of elements other than Si and N in the second region inside the first region, it should satisfy the range of $0.8 \leq pA/pB \leq 1.2$. For example, detected elements other than Si and N are determined by quantitative analysis of elements per unit area in each of the two-dimensional first and second regions in a cross section including the center of the silicon nitride sintered body. When pA/pB is less than 0.8, aid components are dispersed from the surface, sintering aid components are fewer on the surface than the inside, defects (voids) cause grain removal, and the unevenness of processing occurs due to an increase in the number of starting points for processing. When pA/pB is more than 1.2, many grain boundary phases between crystal grains are formed due to the high sintering component on the surface, and the grain boundary phases form a starting point of fracture and lead to grain removal since they are more brittle than the silicon nitride crystal grains, resulting in unevenness of processing.

In this range limitation of the ratio of the silicon nitride crystal grain to the total value of the detected elements other than Si and N, the closer to 1.0, the less possible of grain removal, which leads to ideal distribution of sintering aids. Therefore, the more preferred range limitation is $0.9 \leq pA/pB \leq 1.1$.

The average grain diameter and aspect ratio of the silicon nitride crystal grains are measured as follows. First, a cross section including the center of the sphere or a circular cross section parallel to the top (or bottom) face of the cylinder is obtained. The cross section is subjected to mirror finish with a surface roughness Ra of 1 µm or less. When D stands for a diameter of the circular cross-section portion, photographs are taken so that the first region from the outermost surface to 0 to 0.01D and the second region inside the first region can be observed with a scanning electron microscope (SEM) to a size of 20 µm×20 µm. The average value is obtained by measuring 50 silicon nitride crystal grains present in each region in the order of the larger grain size. The average value obtained by measuring the 50 larger grains is used as the average value of the grain diameter on observation surface in order to prevent variation in the average value due to the infinite inclusion of grains having small grain size in the calculation.

The aspect ratio is determined by obtaining the length of the long side and the short side of the silicon nitride grains present in each region where the grain size has been measured as described above, and dividing the long side by the short side. The average value of this aspect ratio is then determined.

The total value of quantitative analysis of detected elements other than Si and N in the silicon nitride cross section and the measurement method of quantitative analysis of silicon nitride crystal grains are as follows.

The mirror-finished cross section prepared by the measurement method of the average grain size and aspect ratio is subjected to quantitative analysis of silicon nitride and a sintering aid using an electron probe micro analyzer (EPMA). However, a silicon compound should be excluded from the sintering aid for quantitative analysis since it is difficult to distinguish such compound from silicon nitride.

Examples of the material to be added as a sintering aid that reacts in the sintering step to form a grain boundary phase include Group 2 elements, Group 4 elements, Group 5 elements, Group 6 elements, Group 13 elements, Group 14 elements, and rare-earth elements.

When a Group 2 element is added, it is desirable to select at least one element from Be (beryllium), Mg (magnesium), Ca (calcium), Sr (strontium), Ba (barium), and Ra (radium), and if possible, from Be, Mg, Ca, and Sr. It is desirable to select from Ti (titanium), Zr (zirconium), and Hf (hafnium) when a Group 4 element is added; V (vanadium), Nb (niobium), and Ta (tantalum) when a Group 5 element is added; and Cr (chromium), Mo (molybdenum), and W (tungsten) when a Group 6 element is added. The Group 13 element is preferably selected from B (boron) and Al (aluminum). The Group 14 element is desirably selected from C (carbon) and Si (silicon). When a Group 2 element component, Group 4 element component, Group 5 element component, Group 6 element component, Group 13 element component, or Group 14 element component is added as a sintering aid, it is desirable to add the component as any one of oxide, carbide, and nitride.

When a rare-earth element is added, it is desirable to select at least one of Y (yttrium), La (lanthanum), Ce (cerium), Pr (praseodymium), Nd (neodymium), Pm (promethium), Sm (samarium), Eu (europium), Gd (gadolinium), Tb (terbium), Dy (dysprosium), Ho (holmium), Er (erbium), Tm (thulium), Yb (ytterbium), and Lu (lutetium). In the sintering of silicon nitride, when a rare-earth element is added, the sinterability and the aspect ratio of silicon nitride crystal grains are improved. As a result, a sintered body having very excellent strength properties and wear resistance can be obtained.

Next, the production method will be described. The method for producing a silicon nitride sintered body is not limited as long as the silicon nitride sintered body according to an embodiment has above structure, but the following methods can be cited as method for efficiently producing the silicon nitride sintered body.

First, silicon nitride powder is prepared. The silicon nitride powder preferably has an oxygen content of 1 to 4 wt %, contains 85 wt % or more of α-phase silicon nitride, and has an average grain diameter of 0.8 µm or less. When the oxygen content is high, the grain boundary phase can be made homogeneous, and therefore a homogeneous silicon nitride sintered body having excellent wear resistance can be obtained by growing α-phase silicon nitride powder into β-phase silicon nitride crystal grains in a sintering step.

In the silicon nitride sintered body of the present invention, the surface layer and the inner surface are controlled to be homogeneous. In order to perform such control, it is effective to control the dispersion of the sintering aid. In order to control the dispersion of the sintering aid, it is effective to control the amount of the sintering aid and to perform uniform dispersion along with the silicon nitride powder.

The amount of the sintering aid is preferably 2.0 to 6.0 wt % of at least one of a Group 2 element, a Group 4 element, a Group 5 element, a Group 6 element, a Group 13 element, a Group 14 element, and a rare-earth element. The sintering aid powder preferably has an average grain diameter of 1.8 µm or less. The form of the sintering aid is oxide, carbide, nitride, or the like, and the amount of oxide is preferably 3.0 wt % or less. This is because adding an excessive amount of oxide sintering aid to a raw material having a high oxygen content increases the overall oxygen content, resulting in an excess of the grain boundary phase.

In order to uniformly disperse silicon nitride powders and sintering aid powders, it is effective to disperse the object grains in micro size. Crushing and mixing steps using bead mills, ball mills, pot mills, and the like are effective, but bead mills are preferred for efficient production.

Constant agitation or vibration of raw material compounds during the crushing and mixing steps or after completion of the steps can prevent occurrence of secondary particles formed by bonding between silicon nitride powders, between sintering aid powders, or between a silicon nitride powder and a sintering aid powder. Uniform dispersion can be achieved by having most of the silicon nitride powders and sintering aid powders in the form of primary particles.

Next, an organic auxiliary agent is added to the raw material mixture of silicon nitride powders and sintering aid powders. The raw material mixture and organic auxiliary agent are mixed using a bead mill, ball mill or the like, but a bead mill is preferred for efficient production. A slurry mixed with the organic auxiliary agent is granulated using a spray dryer or the like and the acquired granulated powder is formed into the desired shape. The forming step is performed by a die press, cold isostatic pressing (CIP) or the like. A forming pressure of 200 MPa or more is preferred. The formed body preferably has a diameter of 70 mm or less in the state of the spherical sintered body. If the diameter of the sintered body exceeds 70 mm, uneven sintering is likely to occur, and the uniformity between the vicinity of the surface and the inside is impaired.

The formed body obtained in the forming step is degreased. The degreasing step is preferably performed at a temperature in the range of 400 to 800° C. The degreasing step is performed in air or a non-oxidizing atmosphere, and it is preferable to perform oxidation treatment at the highest degreasing temperature. When the sintered body has a diameter of 40 mm or more, the temperature in a furnace is raised to 300 to 600° C. in a non-oxidizing atmosphere, and then the furnace is cooled to 300 to 400° C. Thereafter, the air or an acidic atmosphere is replaced, and the temperature is again raised to the highest degreasing temperature. This allows to control the volatilization rate of the organic auxiliary agent and prevents damage to the side surface of the sphere or cylinder due to rapid gas volatilization.

Then, the degreased body obtained in the degreasing step is sintered at a temperature in the range of 1600 to 1900° C. If the sintering temperature is lower than 1600° C., grain growth of silicon nitride crystal grains may be insufficient. In other words, the reaction from α-phase silicon nitride to β-phase silicon nitride is insufficient, and a dense sintered body structure may not be obtained. In this case, the reliability of the silicon nitride sintered body as a material decreases. If the sintering temperature exceeds 1900° C., the silicon nitride crystal grains may grow too much, resulting in lowered workability. The sintering step may be performed by either atmospheric pressure sintering or pressure sintering. The sintering step is preferably performed in a non-oxidizing atmosphere. Examples of the non-oxidizing atmosphere include a nitrogen atmosphere and an argon atmosphere. The atmosphere gas to be used preferably flows in a certain volume to exhaust gases generated from the sintered body during sintering out of the furnace.

After the sintering process, the silicon nitride sintered body is preferably subjected to hot isostatic pressing (HIP) treatment at 10 MPa or more in a non-oxidizing atmosphere. Examples of the non-oxidizing atmosphere include a nitrogen atmosphere or an argon atmosphere. The HIP treatment temperature is preferably in the range of 1500 to 1900° C. The HIP treatment can eliminate pores in the silicon nitride sintered body. If the HIP treatment pressure is less than 10 MPa, such an effect cannot be sufficiently exhibited.

The silicon nitride sintered body thus produced is subjected to a polishing process at necessary portions to produce a wear-resistant member. The polishing process is preferably carried out using diamond abrasives.

Example 1

The silicon nitride powder had an average grain size of 0.8 μm, 92 wt % α-phase silicon nitride, and an impurity oxygen content of 0.8 wt %. When the total amount of the silicon nitride powder and sintering aid was 100 wt %, the aid powder was added so as to have a Si content of 1.0 wt %, a Y content of 2.5 wt %, and an Al content of 1.0 wt %, and was crushed and mixed in a bead mill for 50 hours to prepare a raw material mixture.

The acquired raw material mixture was mixed with a resin binder in a bead mill to make a slurry. The acquired slurry was dried and sprayed with a spray dryer while being constantly stirred to produce a granulated powder. The granulated powder was press-molded at a molding pressure of 150 MPa. The press molding was performed using a mold that forms the powder having a diameter of 60 mm after sintering to provide a spherical press-formed body. The obtained formed body was degreased at 700° C. for 1 hour in a nitrogen atmosphere. In the degreasing step, oxidation treatment was performed by introducing air at the highest degreasing temperature. The degreased body was subjected to atmospheric pressure sintering at 1800° C. for 4 hours in a nitrogen atmosphere. The flow rate of nitrogen gas was set to 30 L/min at the highest sintering temperature for atmospheric pressure sintering. The internal volume of the sintering furnace used for sintering was about 0.9 m$^3$ (900 L). The sintered body was subjected to HIP treatment at 1600° C. and 20 MPa for 2 hours.

The spherical silicon nitride sintered body was cut at an arbitrary circular cross section including the center of the silicon nitride sintered body, and was mirror-polished. After that, enlarged photographs (SEM photographs) were taken in the vicinity of 0.3 mm (0.005D) from the surface and the vicinity of 1.8 mm (0.03D) from the surface. When a 20 μm×20 μm unit area on the enlarged photographs was set to determine the average grain size and aspect ratio of 50 silicon nitride crystal grains in the order of the larger grain size, the average grain size (dA) in the cross section 0.3 mm from the surface was 1.16 μm, the aspect ratio (rA) was 2.0 μm, the average grain size (dB) in the cross section 1.8 mm from the surface was 1.05 μm, and the aspect ratio (rB) was 2.1. Therefore, dA/dB was 1.10 while rA/rB was 0.95. Next, when the percentage of the grains having average grain sizes (dA and dB) of 1.1 μm or more was measured from each of the enlarged photographs, the percentage at 0.3 mm from the surface was 49%, and at 1.8 mm from the surface was 47%.

In addition, Si, Al and Y were quantitatively analyzed by EPMA at the same place observed by SEM. The ratio (pA) obtained by dividing the total quantitative analysis values of the detected Al and Y elements other than Si and N at 0.3 mm from the surface by the quantitative analysis value of Si was 0.037. Similarly, the ratio (pB) at 1.8 mm from the surface was 0.036. Therefore, pA/pB was 1.03.

Sintered bodies produced under the same conditions were subjected to roughening to remove surface protrusions and the like, and then being worked under semi-polishing conditions (with 3 μm abrasives) for 10 hours and under finishing conditions (0.25 μm abrasives) for 4 hours by a polishing machine. The finished spheres were set in any circumferential direction and subjected to measurement of for diameter irregularity (difference between the maximum and minimum values), sphericity, and surface roughness (Ra), which were 0.28 μm, 0.24 μm, and 0.027 μm, respectively.

Subsequently, each of the silicon nitride sintered bodies was measured for hardness (HV) and three-point bending strength (σf), which were 1480 and 880 MPa, respectively. Samples (silicon nitride sintered body) for measurement of the three-point bending strength were processed into a size of 3 mm×4 mm×50 mm and measured in accordance with JIS-R-1601.

Examples 1 to 6 and Comparative Examples 1 to 4

Test pieces of silicon nitride sintered bodies were prepared under other production conditions based on Example 1. Table 1 shows Examples (1 to 6) and Comparative Examples (1 to 4) of the type of a sintering aid and the amount of a sintering aid added, a method of crushing and mixing the aid (mixing time), a method of mixing an organic auxiliary agent (mixing time), degreasing conditions (degreasing temperature and the presence or absence of oxidation treatment), and sintering conditions (sintering temperature–sintering time–gas flow rate). In the Comparative Examples, no stirring was performed until spray drying with a spray dryer. The other conditions were the same as in Example 1. Note that the amount of the sintering aid added is a ratio when the total amount of the silicon nitride powder and the sintering aid is 100 wt %.

TABLE 1

| | The amount of aid added [wt %] | Method of mixing aid (mixing time) + Method of mixing organic auxiliary agent (mixing time) | Degreasing-condition Degreasing-temperature Oxidation-treatment | Sintering-condition Sintering temperature-Sintering time-Gas flow rate |
|---|---|---|---|---|
| Example 1 | Si (1.0) Y (2.5) Al (1.0) | Bead mill (50 Hr) + Bead mill (25 Hr) | 650° C. Oxidation-treatment | 1800° C.-4 Hr-30 L/min |
| Example 2 | Si (2.5) Al (1.5) La (0.5) | Bead mill (50 Hr) + Bead mill (25 Hr) | 650° C. Oxidation-treatment | 1750° C.-4 Hr-30 L/min |
| Example 3 | Si (3.0) Mg (2.0) Mo (0.5) | Bead mill (50 Hr) + Bead mill (25 Hr) | 650° C. Oxidation-treatment | 1800° C.-4 Hr-30 L/min |
| Example 4 | Zr (2.0) Nb (2.0) Cr (1.5) | Bead mill (50 Hr) + Bead mill (25 Hr) | 700° C. Oxidation-treatment | 1750° C.-4 Hr-30 L/min |
| Example 5 | Zr (3.5) Y (2.0) | Bead mill (50 Hr) + Bead mill (25 Hr) | 700° C. Oxidation-treatment | 1800° C.-4 Hr-30 L/min |
| Example 6 | Ca (3.5) Nb (1.5) V (0.5) | Bead mill (50 Hr) + Bead mill (25 Hr) | 650° C. Oxidation-treatment | 1750° C.-4 Hr-30 L/min |
| Comparative Example 1 | Si (1.0) Y (0.5) Al (0.3) | Bead mill (50 Hr) + Bead mill (25 Hr) | 650° C. treatment | 1800° C.-4 Hr-30 L/min |
| Comparative Example 2 | Si (2.5) Al (1.5) La (0.5) | Bead mill (50 Hr) + Ball mill (25 Hr) | 650° C. Oxidation-treatment | 1750° C.-4 Hr-30 L/min |
| Comparative Example 3 | Ti (3.0) Mg (2.0) Mo (0.5) | Bead mill (50 Hr) + Bead mill (25 Hr) | 650° C. Oxidation-treatment | 1800° C.-4 Hr-30 L/min |
| Comparative Example 4 | Zr (3.5) Nb (2.0) | Bead mill (50 Hr) + Bead mill (25 Hr) | 700° C. No oxidation-treatment | 1750° C.-4 Hr-15 L/min |

Table 2 shows the average grain diameter dA of silicon nitride crystal grains in an arbitrary circular cross section in the first region from the outermost surface to a depth of 0 to 0.01D, the average grain diameter dB in the second region inside the first region, the ratio of dA to dB (dA/dB), the average aspect ratio rA of silicon nitride crystal grains in an arbitrary circular cross section in the first region, the average aspect ratio rB in the second region, and the ratio of rA to rB (rA/rB) in Examples 1 to 6 and Comparative Examples 1 to 4. The silicon nitride sintered bodies described in Examples 1 to 6 and Comparative Examples 1 to 4 have a diameter of 8 mm or more and 70 mm or less.

TABLE 2

| | Average grain diameter dA [μm] | Average grain diameter dB [μm] | dA/dB | Average aspect ratio rA | Average aspect ratio rB | rA/rB |
|---|---|---|---|---|---|---|
| Example 1 | 1.16 | 1.05 | 1.10 | 2.0 | 2.1 | 0.95 |
| Example 2 | 1.18 | 1.09 | 1.08 | 2.1 | 2.0 | 1.05 |
| Example 3 | 1.21 | 1.03 | 1.17 | 2.0 | 2.2 | 0.91 |
| Example 4 | 1.11 | 1.10 | 1.01 | 2.2 | 2.1 | 1.05 |
| Example 5 | 1.11 | 1.14 | 0.97 | 1.9 | 2.2 | 0.86 |
| Example 6 | 1.05 | 1.21 | 0.88 | 2.2 | 1.9 | 1.16 |
| Comparative Example 1 | 1.27 | 1.04 | 1.22 | 2.3 | 1.9 | 1.21 |
| Comparative Example 2 | 0.92 | 1.16 | 0.79 | 1.7 | 2.1 | 0.77 |
| Comparative Example 3 | 1.21 | 1.17 | 1.03 | 2.0 | 1.8 | 1.11 |
| Comparative Example 4 | 0.97 | 1.08 | 0.90 | 2.0 | 2.0 | 1.00 |

For Examples 1 to 6 and Comparative Examples 1 to 4, Table 3 shows the percentage (%) of the area occupied by a region where the average grain diameter dA of silicon nitride crystal grains in an arbitrary circular cross section in the first region from the outermost surface to a depth of 0 to 0.01D is 1.1 μm or more, the percentage (%) of the area occupied by a region where the average grain diameter dB in the second region inside the first region is 1.1 μm or more, the ratio pA of the silicon nitride crystal grain to the total value of detected elements other than Si and N by quantitative analysis of elements per unit area in an arbitrary circular cross section in the first region, the ratio pB of the silicon nitride crystal grain to the total value of detected elements other than Si and N in the second region, and the ratio of pA to pB (pA/pB).

TABLE 3

| | Percentage of dA over 1.1 μm [%] | Percentage of dB over 1.1 μm [%] | Ratio of sintering aid to silicon nitride pA | Ratio of sintering aid to silicon nitride pB | pA/pB |
|---|---|---|---|---|---|
| Example 1 | 49 | 47 | 0.037 | 0.036 | 1.03 |
| Example 2 | 48 | 46 | 0.021 | 0.020 | 1.05 |
| Example 3 | 52 | 43 | 0.026 | 0.026 | 1.00 |
| Example 4 | 47 | 47 | 0.070 | 0.069 | 1.01 |
| Example 5 | 47 | 48 | 0.059 | 0.057 | 1.04 |
| Example 6 | 45 | 51 | 0.059 | 0.056 | 1.05 |
| Comparative Example 1 | 47 | 44 | 0.010 | 0.008 | 1.13 |
| Comparative Example 2 | 37 | 46 | 0.022 | 0.018 | 1.22 |
| Comparative Example 3 | 45 | 44 | 0.051 | 0.065 | 0.78 |
| Comparative Example 4 | 35 | 43 | 0.060 | 0.054 | 1.11 |

Table 4 shows the diameter irregularity (difference between the maximum and minimum values), sphericity, surface roughness (Ra), hardness (HV), and three-point bending strength (σf) of the finished spheres in Examples 1 to 6 and Comparative Examples 1 to 4 set in any circumferential direction.

TABLE 4

| | Diameter irregularity [μm] | Sphericity [μm] | Surface roughness Ra [μm] | Hardness [HV] | Three-point bending strength of [MPa] |
|---|---|---|---|---|---|
| Example 1 | 0.28 | 0.24 | 0.027 | 1480 | 880 |
| Example 2 | 0.33 | 0.31 | 0.032 | 1478 | 890 |
| Example 3 | 0.37 | 0.39 | 0.034 | 1524 | 781 |
| Example 4 | 0.40 | 0.39 | 0.036 | 1460 | 761 |
| Example 5 | 0.43 | 0.41 | 0.036 | 1485 | 847 |
| Example 6 | 0.49 | 0.44 | 0.038 | 1453 | 765 |
| Comparative Example 1 | 0.71 | 0.76 | 0.055 | 1500 | 824 |
| Comparative Example 2 | 0.82 | 0.85 | 0.060 | 1481 | 790 |
| Comparative Example 3 | 0.90 | 0.93 | 0.077 | 1493 | 851 |
| Comparative Example 4 | 1.01 | 1.10 | 0.097 | 1516 | 763 |

The silicon nitride sintered bodies according to Examples and Comparative Examples all have high values of a hardness of 1400 or more and a three-point bending strength of 760 MPa or more.

The silicon nitride sintered bodies according to Examples 1 to 6 all have a diameter irregularity of 0.5 μm or less, a sphericity of 0.45 μm or less, and a surface roughness (Ra) of 0.04 μm or less.

In contrast, while the same processing conditions were applied to Comparative Examples 1 to 4, the silicon nitride sintered bodies have a diameter irregularity of 0.71 to 1.01 μm, a sphericity of 0.76 to 1.10 μm, and a surface roughness (Ra) of 0.05 to 0.97 μm, each of which was larger than that of Examples.

Based on these experimental results, it can be concluded that the silicon nitride sintered bodies in Examples are very excellent in the workability of the surface and can suppress a difference in workability between the surface and the inside, thereby reducing variations in the machining quality and dimensions in mass production.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A silicon nitride sintered body having a shape of a sphere, the silicon nitride sintered body comprising a silicon nitride crystal grains and grain boundary phases, wherein
the sphere before being subjected to surface processing has a diameter of 8 mm or more and 60 mm or less as the width,
when D stands for width of the silicon nitride sintered body before being subjected to surface processing, relations between an average grain diameter dA and an average aspect ratio rA of the silicon nitride crystal grain in a first region from an outermost surface to a depth of 0 to 0.01D and an average grain diameter dB and an average aspect ratio rB of the silicon nitride crystal grain in a second region inside the first region satisfy inequalities:

$0.8 \leq dA/dB \leq 0.97$ or $1.01 \leq dA/dB \leq 1.2$; and $0.8 \leq rA/rB \leq 0.95$ or $1.05 \leq rA/rB \leq 1.2$, and both the average grain diameter dA and the average grain diameter dB of the silicon nitride sintered body are 1.1 μm or more.

2. The silicon nitride sintered body according to claim 1, wherein both the first region and the second region have 40% or more of the silicon nitride crystal grains.

3. The silicon nitride sintered body according to claim 1, wherein a relation between a ratio pA of the silicon nitride crystal grains to a total value of elements other than Si and N in the first region and a ratio pB of the silicon nitride crystal grains to a total value of elements other than Si and N in the second region satisfies the inequality:

$0.8 \leq pA/pB \leq 1.2$.

4. The silicon nitride sintered body according to claim 3, wherein detected elements other than Si and N are determined by quantitative analysis of elements per unit area.

5. The silicon nitride sintered body according to claim 1, wherein the average grain diameter dA, the average aspect ratio rA, the average grain diameter dB, and the average aspect ratio rB are determined based on the silicon nitride crystal grains present in a 20 μm×20 μm unit area in each of the first region and the second region.

6. A wear-resistant member using the silicon nitride sintered body according to claim 1.

7. A method for producing the silicon nitride sintered body according to claim 1, comprising
a forming step of forming a granulated powder at a pressure of 200 MPa or more, the granulated powder being prepared by granulating a raw material mixture of a silicon nitride powder and a sintering aid powder.

* * * * *